Oct. 23, 1962  M. J. STURTEVANT ET AL  3,059,562
VEHICLE WINDOW AIR FLOW DEFLECTOR
Filed Oct. 2, 1959  3 Sheets-Sheet 1
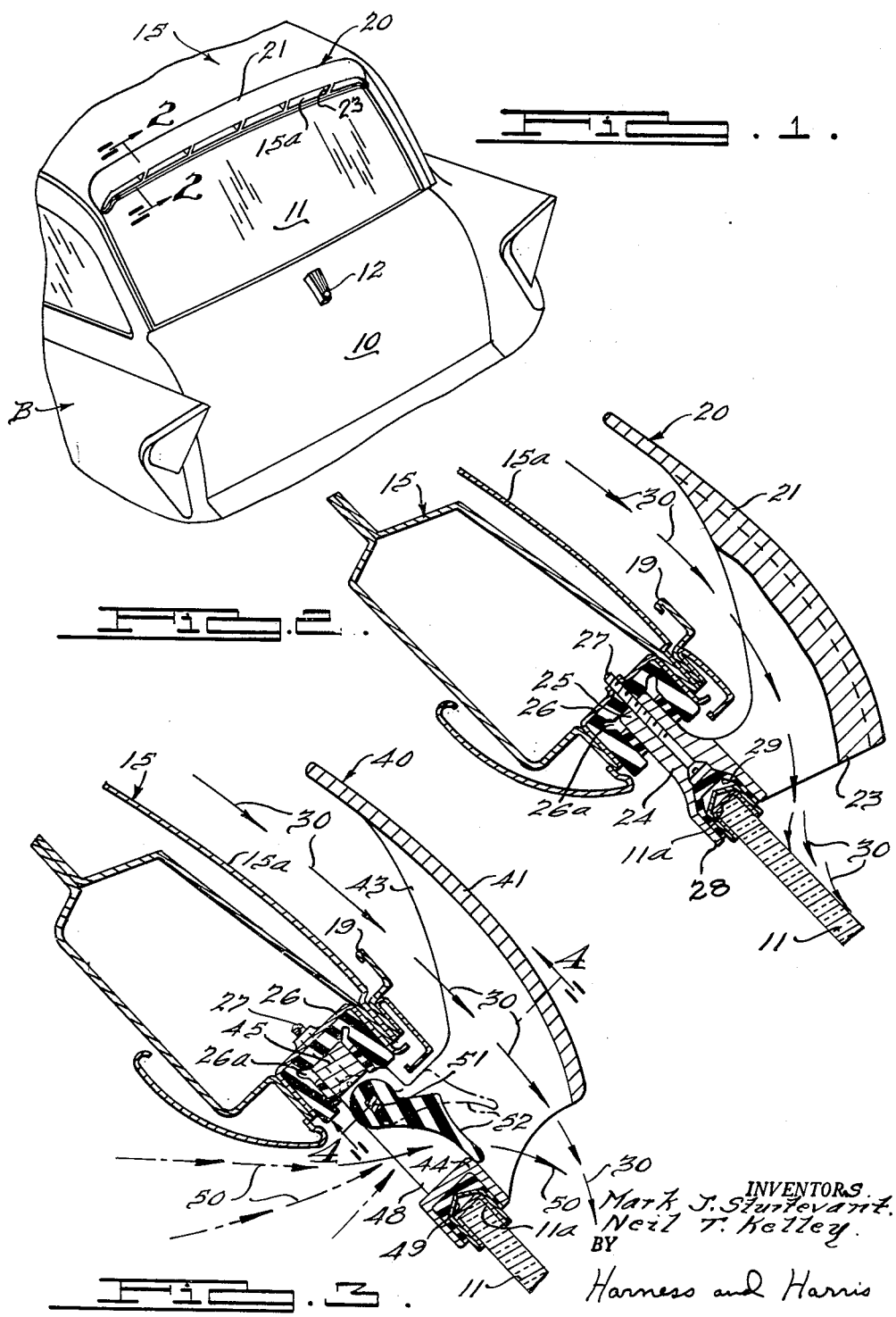
INVENTORS.
Mark J. Sturtevant.
Neil T. Kelley.
BY
Harness and Harris
ATTORNEYS.

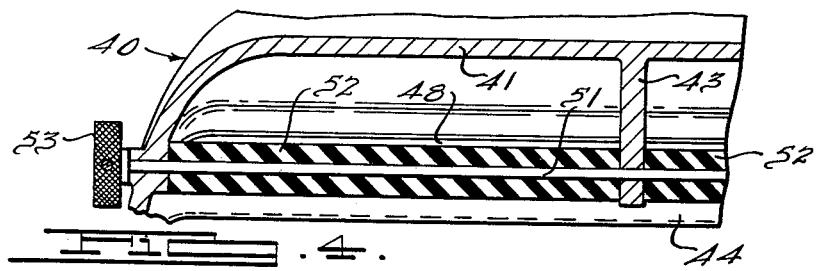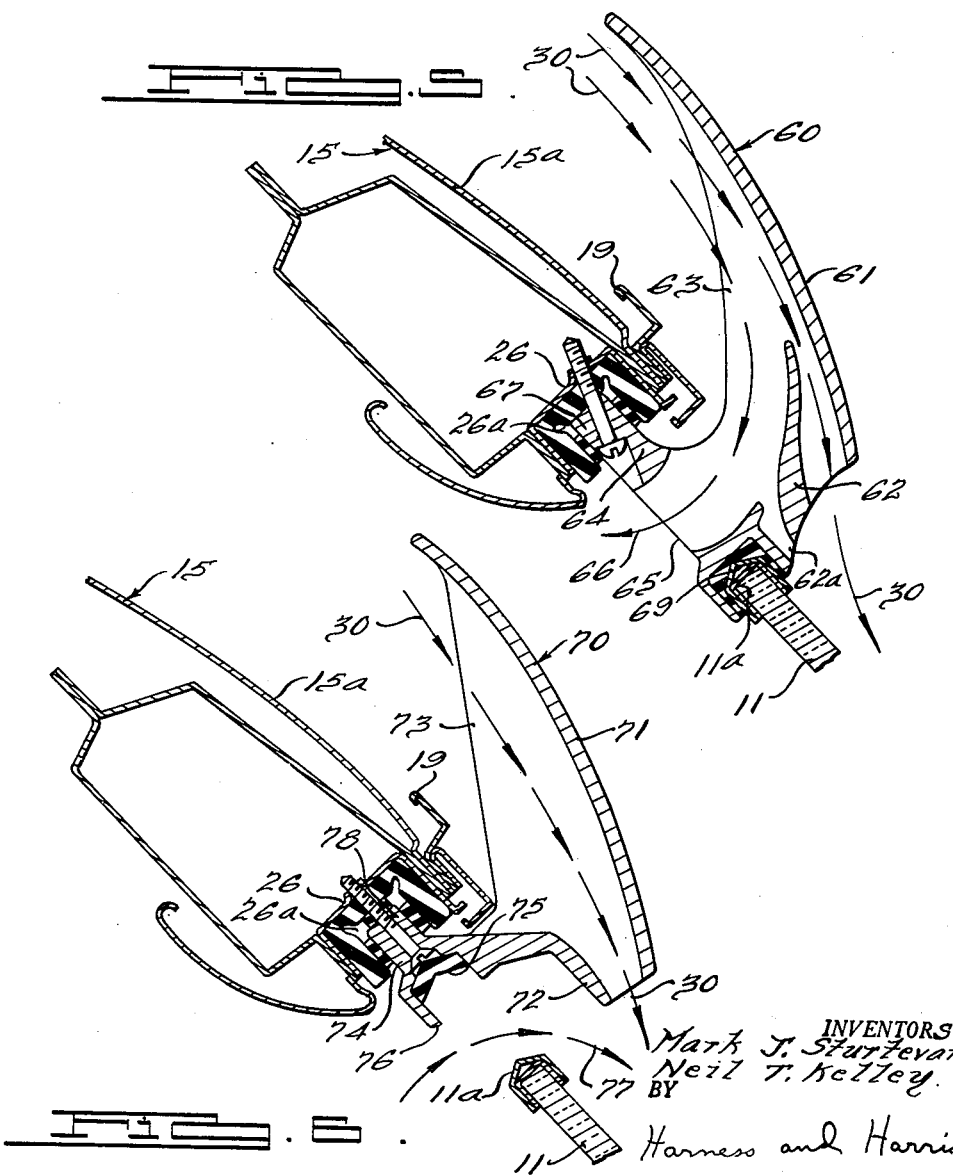

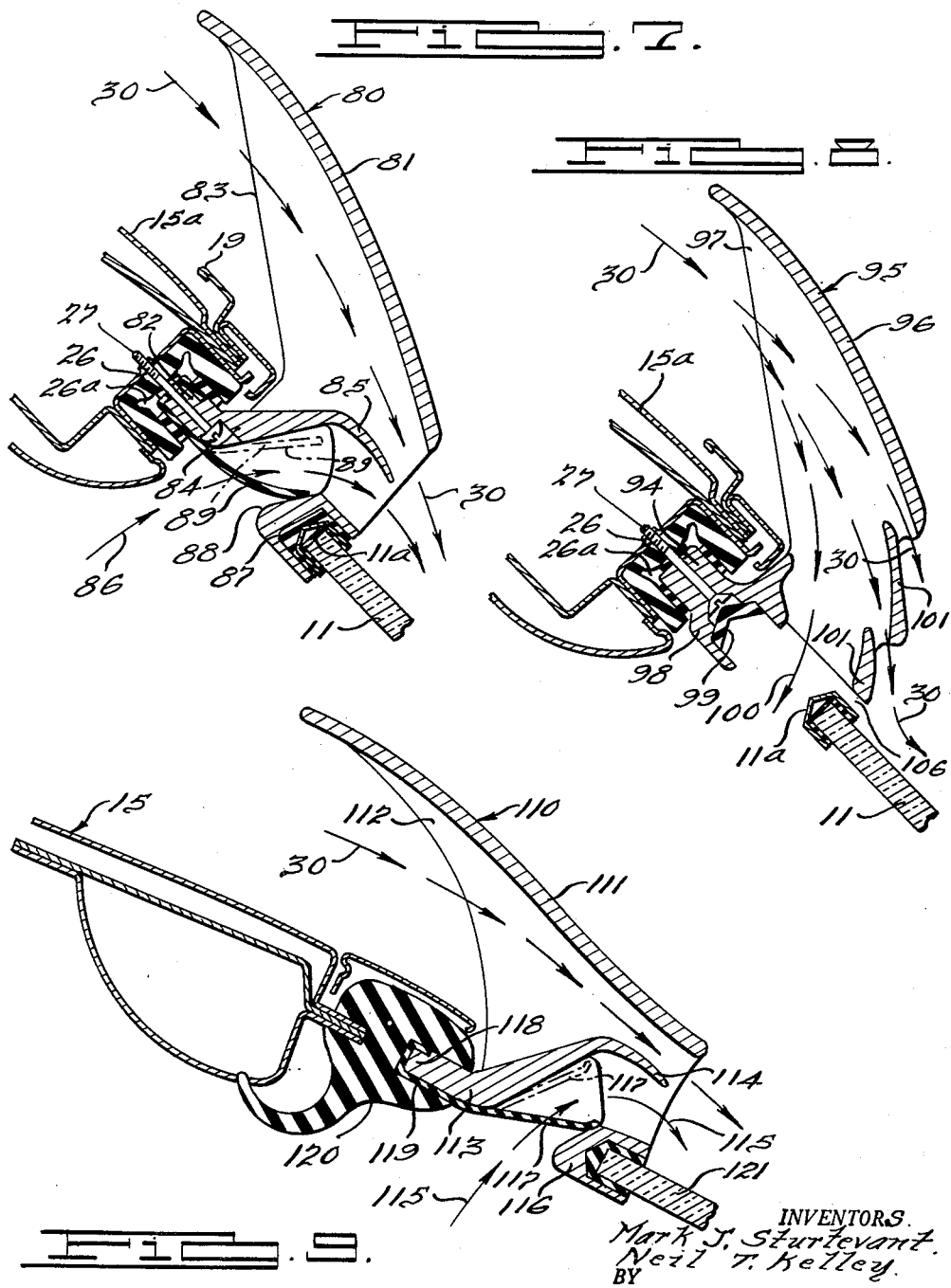

_United States Patent Office_  
3,059,562  
Patented Oct. 23, 1962

3,059,562
VEHICLE WINDOW AIR FLOW DEFLECTOR
Mark J. Sturtevant, Grosse Pointe, and Neil T. Kelley, Birmingham, Mich., assignors to Chrysler Corporation, Highland Park, Mich., a corporation of Delaware
Filed Oct. 2, 1959, Ser. No. 844,021
7 Claims. (Cl. 98—2)

This invention relates to an air flow deflector adapted to be permanently or detachably applied to a rear window opening of a vehicle body or the like, whereby air flow along the body will be deflected downwardly across a vehicle window located at the rear of the vehicle in order to prevent the accumulation of dust, dirt, snow, or the like, on the rear window surface so as to impair visibility therethrough.

It is known that a partial vacuum forms in the area at the rear of a vehicle when it is traveling forwardly such that dirt, dust, snow or the like tend to accumulate on the body and window surfaces extending across the rear portion of the vehicle.

It is a prime object of this invention to provide an air flow deflector at the rear portion of the vehicle such that air flow along the vehicle roof will be directed or deflected downwardly across the body rear end window surface to prevent the deposition of dirt, dust, snow, or the like, on the rear window surface.

It is another object of this invention to provide an air flow deflector for the rear window opening of a vehicle that is compatible with the body styling and does not interfere in any way with operation of the rear window and/or the associated tailgate that may extend across the rear portion of the vehicle body.

It is still another object of this invention to provide an air flow deflector for the rear window of a motor vehicle which deflector may be constructed so it can be readily added as a permanently installed or detachable accessory for the vehicle by a relatively simple installation step.

It is still another object of this invention to provide an air flow deflector for the rear window of a vehicle wherein adjustable flap valve means are provided in addition to the air flow so that an aspirator effect can be achieved to withdraw air from the interior of the vehicle and thereby provide a vehicle interior ventilation device in addition to providing means to prevent the accumulation of dirt, dust, snow, or the like on the vehicle rear window.

It is still another object of this invention to provide an air flow deflector for the rear window of a motor vehicle that includes deflector supporting means adapted to seat in the vehicle body window panel receiving channel and that also includes means to sealingly engage an edge of the associated window panel.

It is still another object of this invention to provide an air flow deflector for a window of a motor vehicle that serves a dual function namely, to provide an air spray across the associated window panel to prevent the accumulation of dust, dirt, snow, or the like, on the outer surface of the window panel and to also include means for air flow between the interior and exterior of the motor vehicle body through ports provided by the air flow deflector means.

It is still another object of this invention to provide an air flow deflector for a window opening of a motor vehicle body which deflector includes means to direct an air spray across the outer surface of the associated window panel and vane means to direct a portion of the air flow through the deflector means into the interior of the associated vehicle body with said air flow deflector means including moisture or rain trap means for the drainage of liquid that might pass through the deflector means.

Other objects and advantages of this invention will become readily apparent from a reading of the following description and a consideration of the related drawings wherein:

FIG. 1 is a perspective view looking at the rear end of a motor vehicle of the suburban type to which an embodiment of this invention has been applied;

FIG. 2 is an enlarged sectional elevational view taken along the line 2—2 of FIG. 1;

FIG. 3 is a sectional elevational view, similar to FIG. 2, showing a modified form of air flow deflector that includes an aspirator flap for car interior ventilation;

FIG. 4 is a sectional elevational view of the FIG. 3 modification, the view being taken along the line of and in the direction of the arrows 4—4 of FIG. 3;

FIG. 5 is a sectional elevational view similar to FIGS. 2 and 3, showing another modified form of the air flow deflector that includes internal vanes and associated ports to provide for the introduction of outside air to the car interior;

FIG. 6 is a sectional elevational view similar to FIG. 2, wherein the air flow deflector includes porting to provide for the aspiration of air from the car interior, wherein the associated window can be used as a valve to control the aspiration effect;

FIG. 7 is a sectional elevational view of another modified form of the invention similar to the form shown in FIG. 3, wherein an automatically operated rubber flap is utilized to provide the aspiration effect for withdrawing air from the car interior;

FIG. 8 is a sectional elevational view of another modified form of the invention that is similar to the form shown in FIG. 5, wherein the air flow deflector is formed with port means controlled by movement of the vehicle window to control the amount of air introduced into the car interior through the air flow deflector; and FIG. 9 is a sectional elevational view of another modified form of the invention that is similar to the form shown in FIG. 7, but differs therefrom in that it is adapted for application to any window of a motor vehicle rather than being restricted for use with an adjustable window such as the rear window of a suburban type vehicle.

FIG. 1 of the drawings shows the rear end portion of a current type of suburban or station wagon motor vehicle. This vehicle body B has a hingedly mounted tailgate 10 extending across the lower portion of the body rear end and the tailgate 10 mounts an adjustable rear window unit 11 that extends across the upper portion of tailgate 10. Window 11 is adapted to be telescopically moved into and extended from the tailgate 10 by mechanism, not shown, actuated through the control 12 on the tailgate 10. Control 12 may be a manually operable crank or a key operated switch that will energize an electrically operated window adjusting mechanism (not shown) located within the tailgate 10.

The vehicle body B has a roof 15 that curves downwardly at its rear end portion 15a so that the roof portion 15a blends into the downwardly and rearwardly sloping plane of the tailgate window element 11 (see FIG. 2). Mounted adjacent to and extending transversely of the vehicle body roof 15 at its rear end portion 15a is an air flow deflector device 20. Air flow deflector device 20 comprises a shell member 21 of substantial width that bridges the upper portion of the rear window opening adjacent the vehicle roof portion 15a. Extending downwardly from the underside of the deflector shell 21 are a plurality of transversely spaced, longitudinally directed, vertically extending, support webs 23. The webs 23 are connected to a support strip 24 that has one edge 25 shaped to seat in the window edge receiving groove 26a of channel 26 of the roof portion 15a. Screws 27, or similar fastening means are used to anchor the base strip 24 of the air flow deflector 20 in the body channel 26. The downwardly projecting edge 28 of the base strip 24 is provided with a channel 29 to receive the upper edge 11a of the adjustable window 11. Obviously some type of cement or other fastening means than screws 27 may be used to connect the deflector base 24 to the vehicle top window opening channel 26. Webs 23 serve as vanes to guide the air flow between the shell 21 and the roof portion 15a. Webs 23 also rigidify the shell mounting and eliminate objectionable flutter or vibrations of the shell 21.

Now considering FIG. 2 in particular, it will be noted that as the vehicle body B is moved forwardly there is an air flow rearwardly across the vehicle top 15 as indicated by the several arrows 30. Because of the mounting of the air flow deflector 20 across the rearwardly located vehicle body roof portion 15a, the air flow currents 30 are redirected or deflected downwardly across the vehicle body rear window 11 and tailgate 10 so as to provide a fast moving air spray or air sheet that sweeps across the window 11 and keeps it free from any accumulation of dirt, dust or snow, or any other foreign matter that might tend to lodge upon the sloping window 11 and tailgate 10 of vehicle body B.

It is a known fact that there is a partial vacuum formed across the rear end of a vehicle as the vehicle body moves forwardly and because of this partial vacuum there is normally a tendency for dirt, dust, snow, and the like, to be sucked up from the roadway and from the area adjacent the rear end of the vehicle and deposited upon the outer surfaces of the rear window 11 and the tailgate 10. By the simple expedient of mounting an air flow deflector across the vehicle body roof rear end portion 15a, a fast moving air current is directed downwardly from the roof 15 across the rear window 11 and the major portion of the tailgate 10 so as to counteract the vacuum effect that would otherwise be present at the rear end of the vehicle. The air current provided by the air deflector 20 is most efficient in sweeping the rear window 11 clean of any foreign matter so that the rear end of the vehicle body, particularly the window 11, will be clear of any deposition of dust, dirt, snow, or the like, thereby giving the vehicle operator and the vehicle passengers maximum visibility at all times through the rear window 11. The vehicle roof 15 includes a rain trough 19 around its periphery to control drainage flow from the roof.

The air flow deflector 20 is shaped to conform to the general styling of the vehicle body and presents a pleasing appearance in addition to being aerodynamically designed so that it will not create noise or power loss problems as the vehicle is moved forwardly at normal vehicle speeds. The webs 23 on the air deflector shell 21 assist in guiding the flow of air through the deflector device 20 and tend to prevent turbulence while also insuring an even distribution of air flow across the width of the rear window 11.

FIG. 3 shows a modified form of this invention wherein the air flow deflector 40 includes the top shell portion 41, transversely spaced upright web portions 43 depending from the underside of the shell portion 41 and a base strip portion 44 that is adapted to be seated in the channel opening 26a in the window opening channel 26. The base portion 44 of deflector 40 is provided with a plurality of slots 48 that are arranged to be opened and closed by the flap valve means 52. The flap valves 52 are fixed on a rotatable support shaft 51 that is adapted to be operated by the knurled handle 53 positioned at one or both of the ends of the shaft 51. As was the case with the form of the invention shown in FIGS. 1 and 2, the base portion 44 of the deflector 40 includes a portion 45 that is adapted to sealingly fit in the opening 26a in the channel member 26. Likewise, the base member 44 of the deflector 40 includes a channel-like groove 49 that is adapted to receive and sealingly engage with the upper end portion 11a of the adjustable window 11.

When a vehicle having the form of the invention shown in FIG. 3 moves forwardly there is an air flow along the rear portion 15a of the vehicle roof 16 as indicated by the arrows 30. This air flow 30 is deflected by the shell 41 so as to pass an airstream downwardly across the outside surface of the window element 11 and thereby keep the outer surface of the window element 11 free from any deposition of dirt, dust, snow, or the like. If it is desired to utilize the air flow 30 to produce an aspiration effect to withdraw air from the interior of the vehicle body B, then, the control shaft 51 is rotated by the knob 53 such that the resilient flat valves 52 are moved from their full line position to the broken line position shown in FIG. 3. When valves 52 are in their opened, broken line position the air flow 30 produces a suction effect that withdraws air from the car interior as indicated by the flow lines 50. Thus it will be seen that the flat valves 52 can be manually adjusted through the control shaft 51 to open and close the ports 48 in the base strip 44 of the air flow deflector 40 and thereby control the amount of air to be withdrawn from the car interior by the air flow 30 that is also being used to sweep the outer surface of the window 11 clear of any deposition of dirt, snow, or the like. It is thought to be obvious that the air flow deflector 40 is a double purpose unit that not only cleans the window 11 but also provides a ventilation control means for the car body interior.

FIG. 5 shows a modified form of this invention wherein the air flow deflector 60 includes means for sweeping deposition from the outer surface of the rear window 11 and also includes means for introducing fresh air to the interior of the motor vehicle body. Here again the air flow deflector device serves a dual function. Air flow deflector 60 includes the shell 61 and spaced upright depending webs 63 that are seated on the base portion 64 of the deflector 60. Base portion 64 of the deflector 60 includes a portion 67 to seat in the channel 26a of the body member 26 and it also includes a channel-like groove 69 to receive the upper end portion 11a of the window 11. The base portion 64 is provided with a plurality of ports 65 that extend between the spaced webs 63 so as to provide for introduction of outside air to the car body interior. The deflector 60 also includes a plurality of vanes 62 that are arranged between the base portion 64 and the shell member 61 so as to divide the airstream 30 into two branches with one branch passing between the upper side of the vane 62 and the lower side of the shell 61 to produce an air flow 30 across the outer side of the window 11 to keep the window surface free of deposition of dust, dirt, snow, or the like. The other branch of the air flow 30 that is provided by the vane 62 is indicated by the arrows 66 and this air flow passes beneath the underside of the vanes 62 and through the ports 65 into the car body interior. The vanes 62 have spaced slots 62a along the lower sides which act as drain troughs for any entrapped moisture or rain that might be carried into the air deflector by the airstream 30. Because of the drain traps 62a there is little likelihood of moisture being carried into the car body interior by the airstream 66. Because the airstream is taken from the top of the vehicle body it is less likely to include dirt, dust, or other foreign matter, and thus relatively clean fresh air is introduced to the car body interior through the ventilation ports 65 in the deflector 60.

FIG. 6 shows another modified form of the invention, which form is similar in function to the form shown in FIG. 3. It will be noted that the air flow deflector 70 is shaped and arranged so as to provide an aspiration effect to withdraw air from the car body interior. The FIG. 6 form of the invention differs from the form shown in FIG. 3 in that in the FIG. 6 form raising and lowering of the window 11 provides the valve means to control the amount of aspirated air that is withdrawn from the car body interior. Air flow deflector 70 includes the shell 71 with the spaced depending webs 73 connecting the lower side of the shell 71 to the base strip 74. The portions 76, 72 of the base strip 74 provide air flow guiding vanes. Base strip 74 is formed with a portion 78 to seat in the groove 26a of the channel strip 26. Base strip 74 is also provided with a channel-like groove 75 that is adapted to sealingly receive the upper end edge 11a of the adjustable window element 11. The arrows 30 indicate the normal flow of air along the roof portion 15a such that a jet of air is directed on the outer surface of the window element 11 to keep it free of dirt, dust, snow, or the like. Depending on the degree to which the window element 11 has its upper edge 11a lowered from its channel 75, determines the degree of opening of the port formed between the edge 76 of the base portion 74 and the edge 11a of the window. The arrows 77 indicate the air flow that is withdrawn from the car body interior by the aspiration effect of the air flow 30. The form of the invention shown in FIG. 6 is much simpler than that shown in FIG. 3 although the FIG. 3 form of the invention allows for more flexibility of control.

FIG. 7 shows a modified form of the invention that is another version of the forms shown in FIGS. 3 and 6 wherein the air flow deflector includes aspiration means in addition to the air flow means for cleaning the outer surface of the window 11. In the FIG. 7 form, the air flow deflector 80 includes the outer shell 81 and the depending spaced webs 83, 83 that connect the shell to the base portion 84 in spaced relationship. The base portion 84 of the air flow deflector 80 is provided with one or more slots 88 that serve as ventilation ports for the car body interior. Base portion 84 includes an upper edge portion 82 that is adapted to seat in the groove 26a of the body channel member 26. The base portion 84 also includes a grooved lower edge 87 that is adapted to sealingly receive the upper edge 11a of the window 11. Connected to the portion 82 of the base strip 84 is a flexible sealing flap 89 that can be of rubber-like material. This flap 89 is supported in cantilever fashion on the base strip 84 such that it normally rests against the portion 87 of the base strip and closes the ports 88 that connect the car body interior to the car body exterior. When the vehicle air deflector means 80 is in forward motion the air flow 30 produces a suction effect that elevates the flexible flap valve 89 to the broken line position adjacent the air flow vane 85 and thereby opens the ports 88 such that an air flow 86 is created that aspirates air from the car body interior. It will be noted that this aspirated air joins the air flow 30 and assists in sweeping the outer surface of the window 11 clear of any deposition of dust, dirt, snow, or the like.

FIG. 8 shows another modified form of this invention that is similar to the form shown in FIG. 5 in that means are provided to introduce clean fresh air to the car body interior through the air flow deflector means. The FIG. 8 form of the invention differs from the FIG. 5 form in that the FIG. 8 form utilizes the adjustability of the window 11 to control the amount of air that is to be introduced to the car body interior through the air flow deflector means 95. Air flow deflector 95 comprises a shell 96 that is supported by the transversely spaced webs 97 on the base portion 98. Base portion 98 includes an upper edge portion 94 that is adapted to seat in the groove 26a of the body channel member 26. The base portion 98 also includes a channel 99 along its lower side that is adapted to sealingly receive the upper edge 11a of the adjustable window 11. Louvers or vanes 101 extend across the spaces between the webs 97 of the deflector 95 such that a portion of the air flow 30 is redirected into the car interior as indicated by the arrows 100 provided the window 11 has been withdrawn from the channel 99 in the base strip 98. It is thought to be obvious that in this form of the invention the adjustable window 11 is utilized as a valve or cover to control the size of the air port that is utilized for the introduction of outside air to the car body interior. It will be noted that slots 106 are provided the base portion 98 and the window panel 11 so as to provide drainage means for any moisture that may be trapped by the vanes or louvers 101 during the passage of air through the deflector means 95. The form of the invention shown in FIG. 8 has an advantage over the form shown in FIG. 5 in that the window element 11 can be utilized to close off the car body interior from the exterior at the discretion of the window operator without having to remove the air deflector means from the window opening.

FIG. 9 shows another modified form of the invention that is quite similar to the form shown in FIG. 7. As was the case with the FIG. 7 form of the invention, the FIG. 9 form of the invention includes an automatically operable valve flap 117 to control aspiration of air from the car body interior to the car body exterior. The prime difference between the two forms of the invention shown in FIGS. 7 and 9 respectively is that the FIG. 9 form of the invention is adapted for installation in any window opening of a vehicle whereas the FIG. 7 form of the invention is primarily intended for use with an adjustable window such as that normally used as the window section of a suburban vehicle tailgate. The deflector means 110 shown in FIG. 9 includes the outer shell member 111 that has connected to its underside the transversely spaced webs 112 that have their lower ends seated on and connected to the base strip 113. The base strip 113 is provided with an upper end portion 118 that is adapted to seat in the glass receiving groove 119 of the sealing strip 120 that is normally provided around any vehicle body window opening. The base portion 113 of the deflector 110 is provided with internal vanes 114 that assist in directing the flow of the air current 30 on to the outer surface of the window panel 121. Arranged beneath the vanes 114 and forming a part of the base strip 113 is the portion 116 of the base strip that is provided with a groove to receive the edge of the glass panel 121. The portion 116 of the base strip 113 is spaced from the main portion of the base strip 113 so as to provide air ports therebetween. These air ports are normally covered by the flexible flap 117. However, when there is a material air flow 30 through the deflector means 110 the flap valve means 117 is elevated to the broken line position and the ports between the car body interior and the exterior are opened such that an air flow 115 is created that withdraws air from the car body interior. The form of the invention shown in FIG. 9 is better adapted for incorporation in the body design at the time of body build-up whereas the other forms of the invention herein shown can be utilized with any vertically adjustable tailgate window, or the like, because they are arranged to seat in the body channel member 26 that normally receives the upper end of the adjustable glass panel 11.

While the several forms of the air deflector shown in FIGS. 1 through 8 of the drawings each disclose an air deflector arrangement that is adapted to be removably attached to a vehicle body window opening as an added accessory, still, it is within the scope of this invention to incorporate these air flow deflector devices as an integral part of the vehicle body so that they would be a permanent part of the vehicle body structure. Various modifications and alterations in the exact shape and size of the disclosed wind deflectors are thought to be clearly suggested, namely, extension of the deflector device across only the central portion of a vehicle body window or possibly the mounting of air deflector devices at only the opposite side portions of a vehicle body window depending on the particular shape and size of the vehicle body rear end and the size and shape of the vehicle body rear window.

We claim:

1. In combination with a vehicle body having a window opening therein, a window panel adjustably mounted in a portion of said window opening, and an air deflector means mounted in an adjacent portion of said window opening and arranged to deflect air passing over the exterior of the body across said window panel to provide an air current to clean the window outer surface, said air deflector means comprising an outer shell plate extending transversely of and spaced outwardly from the body and converging rearwardly towards the body rear end, and a spaced base portion supporting said plate having means for attachment to the body portion comprising a flange adapted to be seated on the body formaton at the periphery of the window opening that normally receives an edge portion of the window panel, said base portion having other portions arranged with respect to said window panel so as to provide a body ventilating passage therebetween such that the said air current cooporates with said ventilating passage to ventilate the vehicle body interior by the aspiration effect of the deflected air passing over the exterior of the body and through the air deflector means.

2. In combination with a vehicle body having a window opening therein, a window panel adjustably mounted in a portion of said window opening, and an air deflector means mounted in an adjacent portion of said window opening and arranged to deflect air passing over the exterior of the body across said window panel to provide an air current to clean the window outer surface, said air deflector means comprising an outer shell plate spaced outwardly from said body and supported by a connected, base portion having means for attachment to the body portion adjacent the window opening, parts of said base portion being arranged to cooperate with said window panel to provide an air flow body ventilating passage between the vehicle body interior and the vehicle body exterior, said air deflector means including vane means to guide air flow between said deflector plate and base portion.

3. In a combination with a vehicle body having a window opening therein, a window panel movably mounted in a portion of said window opening for substantially vertical reciprocation, and an air deflector means mounted in an adjacent portion of said window opening and arranged to deflect air passing over the exterior of the body downwardly across said window panel to provide an air current to clean the window outer surface, said air deflector means comprising an outer shell plate extending transversely of, spaced outwardly from, and converging rearwardly towards the body window opening and a spaced, connected, base portion supporting said plate having means for attachment to the body portion comprising a flange adapted to be seated on the body formation at the periphery of the window opening that normally receives an edge portion of the window panel and a grooved portion on said base portion adapted to receive the upper edge portion of the associated window panel, said base portion being so arranged that when the upper edge of the window panel is lowered out of contact with said base grooved portion that a body ventilating air flow passage is provided through which air is exhausted from the body interior by the aspiration effect of said air deflected current.

4. In combination with a vehicle body having a window opening therein, a window panel adjustably mounted in a portion of said window opening, and an air deflector means mounted in an adjacent portion of said window opening and arranged to deflect air passing over the exterior of the body downwardly across said window panel to provide an air current to clean the window outer surface, said air deflector means comprising an outer shell plate extending transversely of, spaced outwardly from, and converging rearwardly towards the body window opening and a spaced, connected, base portion supporting said plate having means for attachment to the body portion comprising a flange adapted to be seated on the body formation at the periphery of the window opening that normally receives an edge portion of the window panel, and a grooved portion on said base portion adapted to receive an edge portion of the associated window panel, said grooved base portion cooperating with the adjustable window panel to provide a variable capacity body ventilating port for the transfer of air between the vehicle body interior and exterior as a result of the aspiration effect of the deflected air passing over the body exterior.

5. An air deflector for use in combination with a vehicle body having a window opening therein and a window panel adjustably mounted in said window opening, and wherein said air deflector means is mounted in a portion of said window opening and arranged to deflect air passing over the exterior of the body downwardly across said window panel to provide an air current to clean the window outer surface, said air deflector means comprising an outer shell plate extending transversely of, spaced outwardly from, and converging rearwardly towards the body window opening and a spaced, connected, base portion supporting said plate having means for attachment to the body portion adjacent the window opening comprising a flange adapted to be seated on the body formation at the periphery of the window opening that normally receives an edge portion of the window panel, and a grooved portion on said base portion adapted to receive an edge portion of the associated window panel, said grooved base portion cooperating with the adjustable window panel to provide a variable capacity body ventilating air port for the transfer of air between the vehicle body interior and exterior by the aspiration of air from the vehicle body interior to the body exterior during the passage of air through the air deflector means.

6. In combination with a vehicle body having a window opening therein, a window panel adjustably mounted in a portion of said window opening, and an air deflector means mounted in an adjacent portion of said window opening and arranged to deflect air passing over the exterior of the body downwardly across said window panel to provide an air current to clean the window outer surface, said air deflector means comprising an outer shell plate extending transversely of, spaced outwardly from, and converging rearwardly towards the body window opening and a connected base portion spaced beneath said shell plate having means for attachment to the body portion adjacent the window opening comprising a flange adapted to be seated on the body formation at the periphery of the window opening that normally receives an edge portion of the window panel and a grooved portion on said base portion adapted to receive an edge portion of the associated window panel, said grooved base portion cooperating with the adjustable window panel to provide a variable capacity air port body ventilating means between the vehicle body interior and exterior for the exhaust of air from the interior of the vehicle body during the passage of air through the air deflector means.

7. In combination with a vehicle body having a window opening therein, a resilient sealing strip mounted on said body about the periphery of said window opening, a window panel covering a portion of said opening having certain of its edge portions mounted in said resilient sealing strip, an air deflector means covering other portions of said window opening, said air deflector means comprising an outer shell plate extending transversely of, spaced outwardly from, and converging rearwardly towards the body window opening arranged to deflect air passing over the exterior of the vehicle downwardly across said window panel to provide an air current to clean the window outer surface, and a base portion spaced beneath and supporting said shell having portions thereof mounted on said resilient sealing strip, said air deflector base portion having portions arranged to connect the vehicle body interior with the vehicle body exterior and to provide body ventilating means for air introduction to and exhaust from the body interior when there is air flow through the air deflector means.

References Cited in the file of this patent

UNITED STATES PATENTS

| | | |
|---|---|---|
| 1,128,103 | Carence | Feb. 9, 1915 |
| 1,517,365 | Kleine | Dec. 2, 1924 |
| 2,065,085 | Lynes | Dec. 22, 1936 |
| 2,087,651 | Mygland | July 20, 1937 |
| 2,141,442 | Mead et al. | Dec. 27, 1938 |
| 2,264,014 | Wohlfield | Nov. 25, 1941 |
| 2,625,425 | Foster | Jan. 13, 1953 |
| 2,638,833 | Snyder | May 19, 1953 |
| 2,919,952 | Riddle et al. | Jan. 5, 1960 |